J. H. WHEELER.
CHEESE BOX.
APPLICATION FILED MAR. 31, 1919.

1,312,772.

Patented Aug. 12, 1919.

Witness
Ja. Otto.

Inventor
J. H. Wheeler,
By Erwin, Wheeler & Woolard,
Attorneys

UNITED STATES PATENT OFFICE.

JOHN HARMON WHEELER, OF PLYMOUTH, WISCONSIN.

CHEESE-BOX.

1,312,772. Specification of Letters Patent. Patented Aug. 12, 1919.

Application filed March 31, 1919. Serial No. 286,413.

*To all whom it may concern:*

Be it known that I, JOHN HARMON WHEELER, a citizen of the United States, and resident of Plymouth, Sheboygan county, in the State of Wisconsin, have invented a certain new and useful Improvement in Cheese-Boxes, and do hereby declare that the following is a full, clear, and exact description thereof, such as will enable persons skilled in the art to which the invention pertains to make and use the same, reference being had to the drawings hereto attached for disclosure as to details of construction.

The invention relates to a cheese box used as a container for the cake of cheese at the factory, and is especially designed to meet the requirements of the railroads that cheese presented for transportation shall be inclosed in boxes or containers of a construction which conforms to the specifications prescribed by the railroads as necessary to insure transit and delivery without injury to the containers or their contents.

The forms of cheese boxes or containers heretofore used have been open to several objections, which it is the purpose of my invention to eliminate. The usual form of cheese box constitutes merely a hoop formed from a sheet of thin shaven wood, the ends of which are lapped and united, the grain of the wood running circumferentially of the hoop. The circular bottom of the box is held in place by nails passed through the hoop in a line near one edge thereof. The container is frequently broken by the rough handling which the package receives in transit, such break occurring in the hoop along the line of nails, with the result that the contents of the container are damaged and the commercial value thereof impaired. Again, the hoop frequently splits along lines where the grain of the wood is more or less open and of insufficient cohesion to carry the weight of the cheese cake, with the resulting damage, as before.

The cover for the cheese box is generally formed with a comparatively narrow hoop, which is fitted over the top of the container. Without the provisions of extraneous devices for preserving the engagement of the cover and the box, the cover very frequently becomes detached from the box, and the contents of the latter become exposed and damaged.

The defects hereinabove noted have been vexatious to consignors and consignees of the cheese, as well as to the transportation companies, and have involved a large expenditure of time in the adjustment of claims for damages due to the hard usages of transit. The situation has reached such a stage that unless cheese presented for shipment be packed in boxes or containers of approved form, that is, boxes of substantial construction with covers secured in place, the transportation companies declare themselves absolved from liability for damage resulting from failure to observe the conditions prescribed. The need for extraneous fastening devices for securing the covers of the boxes in position, has been overcome by my present invention.

I have devised a cheese box in which the separation of the hoop to the damage of the contents of the box is entirely prevented, and I accomplish this result by using a series of reinforcing strips which extend across the grain of the wood, of which the hoop is formed, and are secured in place upon the latter. The said reinforcing strips in length are co-extensive with the width of the hoop, and are connected to the bottom of the box, so as to relieve the hoop of the strain incident to the weight of the cheese cake.

At their upper ends the reinforcing strips are beveled, so that when the cover of the box is pressed thereon, the beveled ends of the reinforcing strips act as wedges. This wedging engagement of the cover and the box upon which it is placed, is sufficient to cause the two parts to adhere tightly, so that the package may be transported without the cover thereof becoming detached.

In the accompanying drawings.

Figure 1:
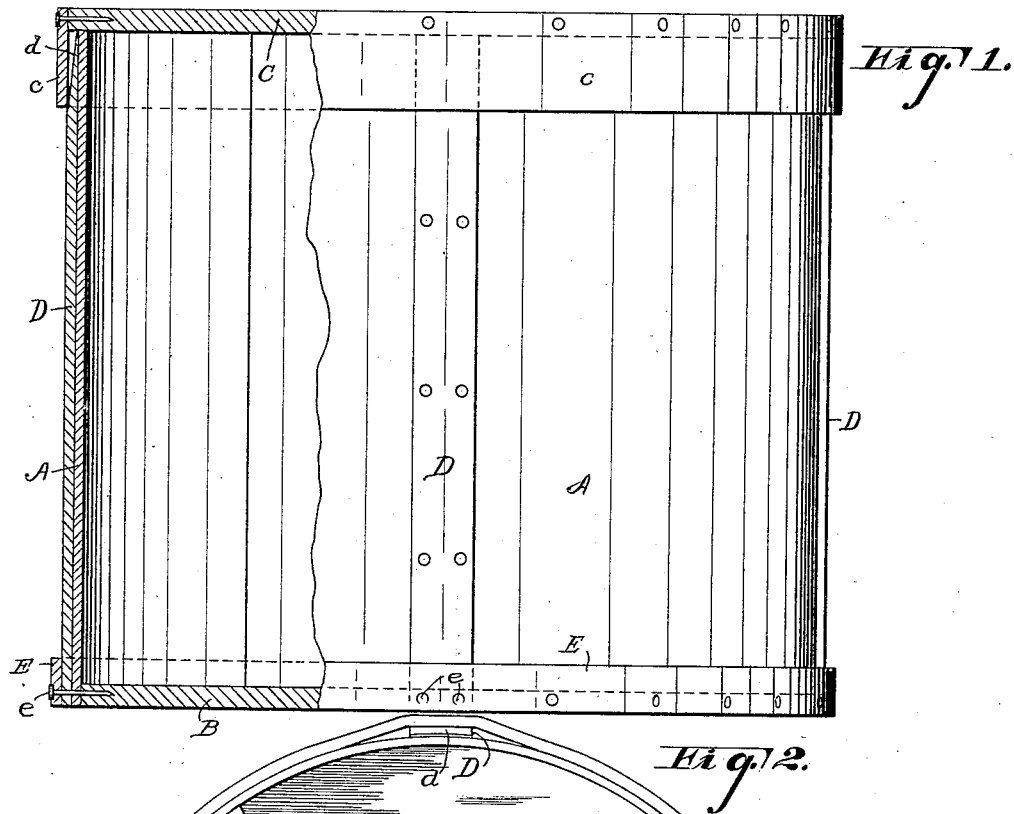
Figure 1 is a view in elevation, partly broken out, showing the features of construction embodied in my invention.
Figure 2:
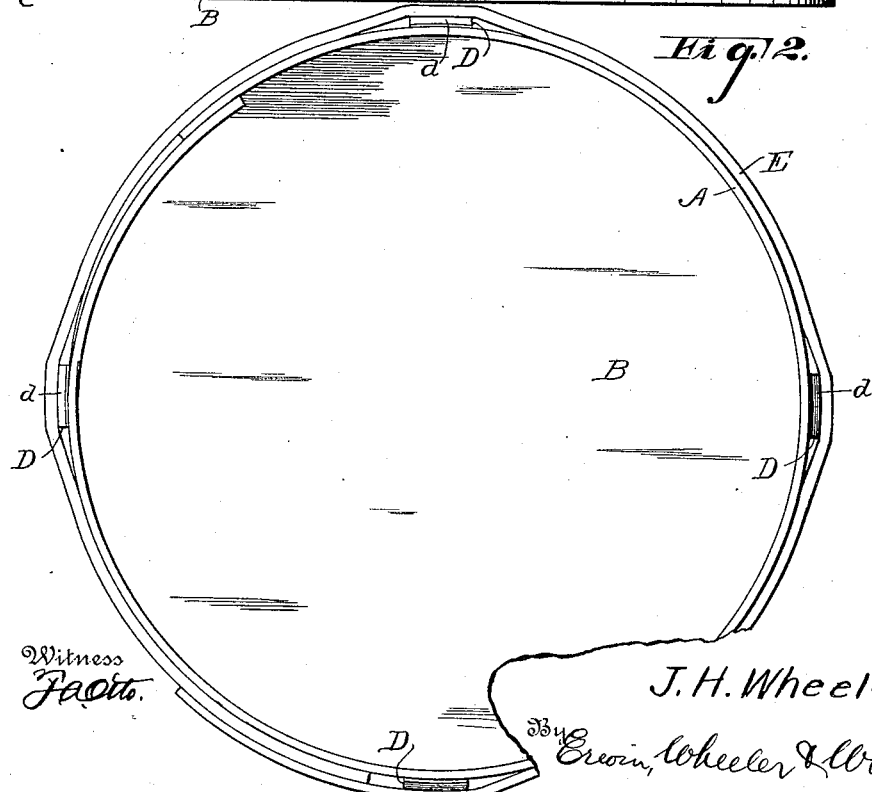
Fig. 2 is a plan view of the cheese box, showing the vertically arranged reinforcing pieces, with their upper ends as beveled.

The cheese box constructed in accordance with my invention will be formed of a hoop A, of a thin sheet of shaven or sawed wood, and bent into circular form with the ends of the sheet lapped and united as usual. The box will be provided with a bottom B and with a cover C.

For the purpose of overcoming the defects of prior structures, and preventing the hoop from breaking loose from the bottom of the box, or from becoming separated at intermediate points along lines in which the grain extends, I have provided the box with a series of reinforcing strips D. These reinforcing strips extend the full width of the hoop, and are suitably secured thereto. A narrow base band or hoop E is placed around the box, at the bottom thereof, outside of the reinforcing strips D, and the said band E is secured to the bottom of the box by nails $e$, which pass through the band, the reinforcing strips and the hoop A. There is thus constructed a box in which the weight of the cheese cake is supported by the reinforcing strips, and the damage to which similar boxes were subjected heretofore in transportation is obviated.

The top C is provided with a narrow band or hoop $c$ of sufficient stock to make a substantial structure. The upper ends of the reinforcing pieces D are beveled at $d$, as shown in the drawings. The cover C is placed upon the box by sliding the hoop or band $c$ over it and the beveled ends $d$ of the reinforcing pieces. A wedging engagement between the box and its cover takes place, and when the cover is seated upon the box, such frictional engagement is sufficient to retain the parts in position while the cheese boxes and their contents are being handled in transit. It is not necessary with my device to employ any other fastening means for securing the cover in its place upon the box. I therefore eliminate the cost of such fastening devices, together with the time required for applying them to and removing them from the cheese boxes.

It will be seen that by the use of my invention that cheese may be transported from the factory to its commercial destination without liability of damage to the cheese. Ordinary care only is necessary to preserve the cheese boxes from being damaged by handling at the time of shipment.

Having thus described my invention, what I claim as new, is:—

A container for transporting cheese, which container comprises a bottom and a hoop, the latter formed from a thin sheet of wood with ends overlapping, the grain of the wood extending circumferentially of the hoop, a series of spaced vertical reinforcing strips attached to the hoop, and to the bottom of the container, such reinforcing strips being tapered at their upper ends, and a cover for the container held in place by frictional engagement with the tapered ends of the vertical reinforcing strip.

It witness whereof I have signed my name at Plymouth, Wisconsin, this 24th day of March, 1919.

J. HARMON WHEELER.

Witnesses:
 FRANK MELLEN,
 ESTHER EDLER.